United States Patent
Lasslo et al.

(10) Patent No.: US 10,776,062 B2
(45) Date of Patent: Sep. 15, 2020

(54) CLOUD SERVICES ACTIVATION FOR A PRINTING DEVICE

(71) Applicant: Hewlett-Packard Development Company, L.P., Houston, TX (US)

(72) Inventors: Laurel Lasslo, San Diego, CA (US); Rajesh Nair, Cochin (IN); Nobuko M Nathan, Encinitas, CA (US); Lajesh Dineshkumar, Fort Collins, CO (US); James Shepherd, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 464 days.

(21) Appl. No.: 15/504,045

(22) PCT Filed: Aug. 19, 2014

(86) PCT No.: PCT/US2014/051704
§ 371 (c)(1),
(2) Date: Feb. 15, 2017

(87) PCT Pub. No.: WO2016/028279
PCT Pub. Date: Feb. 25, 2016

(65) Prior Publication Data
US 2017/0277495 A1 Sep. 28, 2017

(51) Int. Cl.
*G06F 3/12* (2006.01)
*G06F 9/50* (2006.01)
*H04L 29/08* (2006.01)

(52) U.S. Cl.
CPC .......... *G06F 3/1288* (2013.01); *G06F 3/122* (2013.01); *G06F 3/1203* (2013.01); *G06F 3/1204* (2013.01); *G06F 3/1228* (2013.01); *G06F 3/1236* (2013.01); *G06F 3/1268* (2013.01); *G06F 3/1287* (2013.01); *G06F 3/1289* (2013.01); *G06F 3/1292* (2013.01);
(Continued)

(58) Field of Classification Search
None
See application file for complete search history.

(56) References Cited

U.S. PATENT DOCUMENTS

2012/0057193 A1 3/2012 Jazayeri et al.
2012/0140285 A1 6/2012 Kamath et al.
(Continued)

FOREIGN PATENT DOCUMENTS

KR 20110092516 8/2011

OTHER PUBLICATIONS

Sony, "Netflix® Setup & FAQ," Sony eSupport, Aug. 8, 2014, <http://esupport.sony.com/>~ 3 pages.
(Continued)

*Primary Examiner* — Fan Zhang
(74) *Attorney, Agent, or Firm* — HP Inc. Patent Department

(57) ABSTRACT

Examples of activating cloud services for a printing device are disclosed. In one example implementation according to aspects of the present disclosure, a printing device activation process to activate a printing device is performed concurrently with a cloud credentials process to receive a cloud authentication token. A cloud services activation process then activates a cloud service for the printing device.

14 Claims, 3 Drawing Sheets

(52) U.S. Cl.
CPC ............ *G06F 9/5072* (2013.01); *H04L 67/02* (2013.01); *H04L 67/10* (2013.01); *H04L 67/28* (2013.01)

(56) References Cited

U.S. PATENT DOCUMENTS

| | | | |
|---|---|---|---|
| 2012/0200888 A1* | 8/2012 | Kato | G06F 3/1221 |
| | | | 358/1.15 |
| 2013/0003106 A1 | 1/2013 | Nishida et al. | |
| 2013/0279375 A1* | 10/2013 | Newberg | H04W 88/16 |
| | | | 370/260 |
| 2014/0185089 A1 | 7/2014 | Nuggehalli et al. | |
| 2015/0154484 A1* | 6/2015 | Iwasaki | G06K 15/4095 |
| | | | 358/1.14 |
| 2017/0187793 A1* | 6/2017 | Jalan | H04L 67/1008 |

OTHER PUBLICATIONS

Wikipedia, "Google Account," Aug. 6, 2014, 4 pages, <http://en.wikipedia.org/wiki/Google_account>.

* cited by examiner

US 10,776,062 B2

CLOUD SERVICES ACTIVATION FOR A PRINTING DEVICE

BACKGROUND

A printing device, such as a printer, multifunction printer (MFP), or the like, may be utilized to print content on a physical medium such as paper. The printing device may receive an electronic representation of the content from a computing device, such as a desktop or laptop computer, mobile device, etc. Printing devices may also include support for additional services besides basic printing, scanning, and/or copying functions.

BRIEF DESCRIPTION OF THE DRAWINGS

The following detailed description references the drawings, in which.

DETAILED DESCRIPTION

Figure 1:
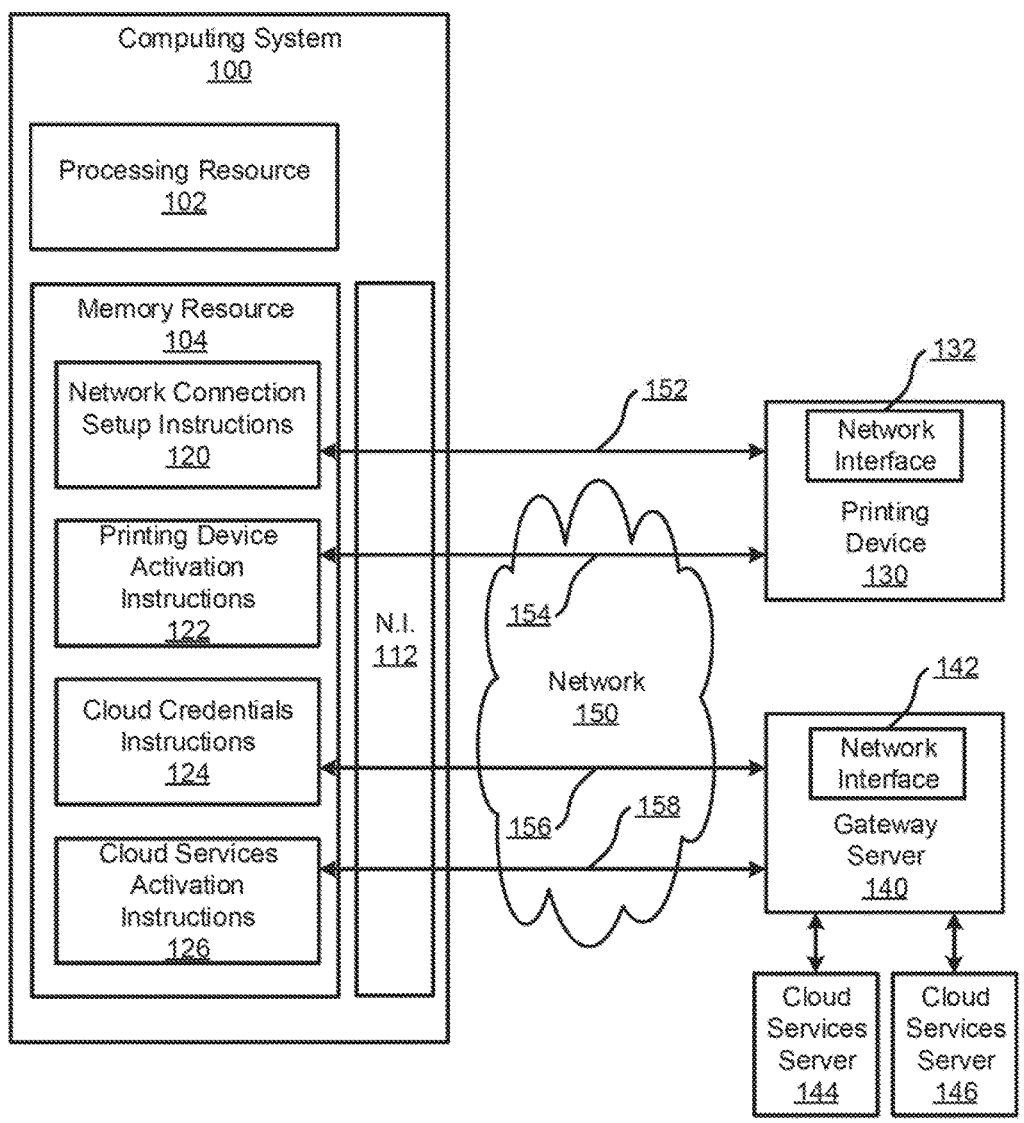
FIG. 1 illustrates a block diagram of a computing system to activate cloud services for a printing device via a gateway server according to examples of the present disclosure.

Besides traditional printing, scanning, and copying functions, printing devices may provide support for additional services, including subscription ink supply services, scanning to a cloud storage device or local storage device, optical character recognition, and remote printing, for example. As printing devices became increasingly advanced, additional services may be incorporated into printing devices. Many of these services may interface and interact with remote resources, such as via the internet or in a cloud environment. Consequently, a printing device may need to activate these services (referred to herein as "cloud services"), such as over the internet or cloud connection.

Activating these services individually, one-at-a-time, or as needed may be time consuming, confusing, and frustrating to a user of a printing device. For example, a user may have to repeat similar activation processes, such as supplying information about the user and printing device, to activate each of the services for a printing device individually. Each of these service activation processes may be time consuming due to the printing device performing multiple "server calls" to activate each service. A server call may include sending activation information to a remote computing device (e.g., server) and waiting for a response from the remote computing device. These "server calls" are a slow and time consuming process because a new server call is performed for each service activation, resulting in multiple server calls. Moreover, a user may forget to activate one or more of the services, rendering the un-activated service(s) unavailable to the user until the service(s) is activated.

Various implementations are described below by referring to several examples of activating cloud services for a printing device. Cloud services may be hosted, cloud-based services or functions such as subscription ink supply services, scanning to a cloud storage device or local storage device, optical character recognition, remote printing, and product registration, among others. In one example implementation according to aspects of the present disclosure, a printing device activation process to activate a printing device is performed concurrently with a cloud credentials process to receive a cloud authentication token. A cloud services activation process then activates a cloud service for the printing device. In examples, a gateway server may receive a bundled cloud services activation request, unbundle the cloud services activation request, and relay the unbundled individual cloud services activation requests to a plurality of cloud services servers.

In some implementations, the setup process for a printing device is shortened and simplified by performing the printing device activation process and the cloud credentials process concurrently. The user setting up the printing device experiences less waiting time during the setup experience. These and other advantages will be apparent from the description that follows.

Figure 2:
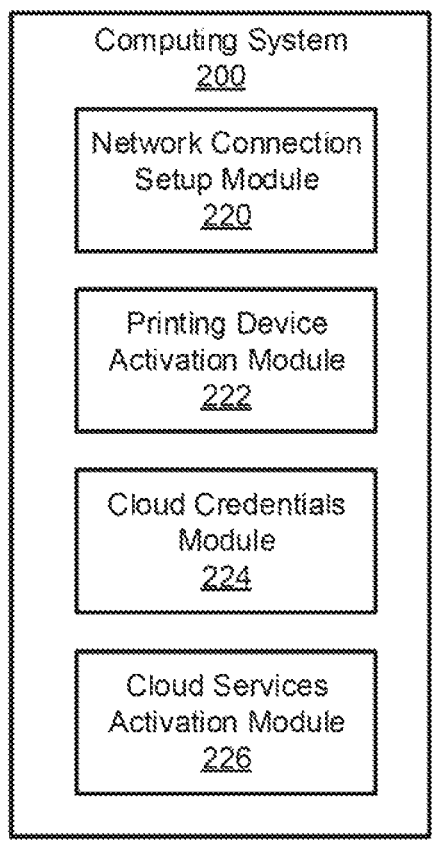
FIG. 2 illustrates a block diagram of a computing system to activate, cloud services for a printing device according to examples of the present disclosure.

Generally, FIGS. 1 and 2 relate to components, modules, and instructions of a computing system, such as computing system 100 of FIG. 1 and computing system 200 of FIG. 2. It should be understood that the computing systems 100 and 200 may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, or the like, or suitable combinations thereof.

FIG. 1 illustrates a block diagram of a computing system 100 to activate cloud services for a printing device 130 via a gateway server 140 according to examples of the present disclosure. The computing system 100 may include a processing resource 102 that represents generally any suitable type or form of processing unit or units capable of processing data or interpreting and executing instructions. The processing resource 102 may be one or more central processing units (CPUs), microprocessors, and/or other hardware devices suitable for retrieval and execution of instructions. The instructions may be stored, for example, on a non-transitory tangible computer-readable storage medium, such as memory resource 104 (as well as computer-readable storage medium 304 of FIG. 3), which may include any electronic, magnetic, optical, or other physical storage device that store executable instructions. Thus, the memory resource 104 may be, for example, random access memory (RAM), electrically-erasable programmable read-only memory (EPPROM), a storage drive, an optical disk, and any other suitable type of volatile or non-volatile memory that stores instructions to cause a programmable processor to perform the techniques described herein. In examples, memory resource 104 includes a main memory, such as a RAM in which the instructions may be stored during runtime, and a secondary memory, such as a nonvolatile memory in which a copy of the instructions is stored.

Alternatively or additionally, the computing system 100 may include dedicated hardware, such as one or more integrated circuits, Application Specific Integrated Circuits (ASICs), Application Specific Special Processors (ASSPs), Field Programmable Gate Arrays (FPGAs) or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

The computing system 100 may include a network interface 112 to facilitate network communications between the computing system 100 and other network-enabled devices, such as printing device 130 (via network interface 132 of printing device 130) and/or gateway server 140 (via network interface 142 of gateway server 140). The communications described herein as occurring via links 152, 154, 156, 158 may be facilitated by the network interface 112. The network interface 112 may be any suitable type of network interface such as a wired and/or wireless network interface to connect to a variety of different network types, including network 150.

The computing system 100 may also include network connection setup instructions 120, printing device activation instructions 122, cloud credentials instructions 126, and cloud services activation instructions 126. The instructions may be processor executable instructions stored on a tangible memory resource such as memory resource 104 and executable by a hardware resource such as processing resource 102. Other instructions may also be utilized as will be discussed further below in other examples. FIG. 1 also illustrates a printing device 130, a gateway server 140, and cloud services servers 144, 146, and a network 150, which are described in more detail herein.

The network connection setup instructions 120 of computing system 100 causes the printing device 130 to connect to the network 150. In examples, the computing system 100 may connect to the printing device 130 via a direct wireless link 152 such as via an 802.11 compliant connection, a Bluetooth connection, a near field communication connection, or another suitable connection. Once connected, the network connection setup instructions 120 of the computing system 100 may cause the printing device 130 to connect to the network 150. For example, this may include causing the printing device to enter an automatic network configuration, which may cause the printing device to connect to a network, such as a wired or wireless network. The computing system 100 and the printing device 130 may terminate the direct wireless link 152 and instead begin communicating via the network 150, for example. Once connected to the network, the printing device may receive an IP address, subnet mask address, gateway address, dynamic name server address, proxy server address, port address, network name, network security credentials, and/or other related network information to connect to the network, such as from a network resource (e.g., server, router, etc.) within the network 150.

Once the printing device 130 is connected to the network 150, the printing device activation instructions 122 initiates a printing device activation process. Concurrent to the printing device activation process, the cloud credentials instructions 124 initiates a cloud credentials process. That is, the printing device activation instructions 122 and the cloud credentials instructions 124 initiate their respective processes at approximately the same time. For example, the printing device activation instructions 122 initiates and performs the printing device activation process while the cloud credentials instructions 124 initiates and performs the cloud credentials process. By performing these processes concurrently, time is saved.

In examples, the printing device activation process performed by the printing device activation instructions 122 may include gathering information about the printing device 130 from the printing device and enabling cloud services on the printing device 130 through link 154 via the network 150. Gathering the information may include sending an information request command from the printing device activation instructions 122 to the printing device 130 through link 154 via the network 150. In response, the printing device 130 transmits the requested information back to the computing system 100 through link 154 via the network 150. The information gathered about the printing device 130 may include a printing device identifier, a model number, a serial number, a name, and other appropriate information about the printing device. Enabling the cloud services on the printing device 130 may include enabling cloud/web services in a firmware or memory (not shown) of the printing device 130. In examples, the printing device 130 may be factory set to have cloud/web services be disabled, such that the cloud/web services are disabled until enabled. However, in other examples, the cloud/web services may be factory set to be enabled.

In examples, the cloud credentials process may include transmitting a request to the gateway server 140 through link 156 via the network 150 to request a cloud authentication token. In examples, the request includes a user authentication credential. The user authentication credential may include a unique username and password combination, a serial number, a claim code, on any other suitable authentication credential. The user may provide the user authentication credential via a user interface (not shown) of the computing system 100. In examples, the user interface may be a web browser and/or mobile application. Additionally, the cloud credentials process may include receiving the cloud authentication token through link 156 via the network 150 responsive to the transmitted request.

The cloud services activation instructions 126 initiates a cloud services activation process to activate a cloud service for the printing device 130. The cloud services activation process includes, in some examples, transmitting a cloud services activation request to the gateway server 140 through link 158 via the network 150. The cloud services activation request includes a plurality of bundled cloud services activation requests. That is, a plurality of bundled cloud services activation requests are bundled together as a single transmission to the gateway server 140. The plurality of bundled cloud services activation requests are to be unpackaged by the gateway server 140 and to be relayed by the gateway server to a plurality of cloud services servers such as cloud services servers 144, 146.

In examples, multiple cloud services may be activated via the bundled cloud services activation process. For example, a first cloud services action request relating to remote printing functionality and a second cloud services activation request relating to ink subscription services may be bundled together to form a plurality of bundled cloud services activation requests. The bundled requests are unbundled by the gateway server 140 and are appropriately relayed to the cloud services servers 144, 146. Of course, additional cloud services and cloud services servers may be added in other examples, and the cloud services may be any suitable type of cloud services for the printing device 30, such as those discussed herein.

The printing device 130 represents generally any suitable a printer, multifunction printer (MFP), or the like, which may be utilized to print content on a physical medium such as paper. The printing device 130 may receive an electronic representation of the content from a computing system or computing device such as computing system 100. As described herein, the printing device 130 may include support for additional services besides basic printing, scanning, and/or copying functions, including subscription ink supply services, scanning to a cloud storage device or local storage device, optical character recognition, and remote printing, etc. The printing device 130 may include a network connection interface 132 to connect to the computing system 100, either directly through the network 150 and/or through the direct wireless link 152.

The gateway server 140 activates cloud services for a printing device by receiving, unbundling, and relaying cloud services activations requests. For example, the gateway server 140 may include a network cloud services activation receipt instructions, an unbundling instructions, and a relay instructions. The instructions may be processor executable instructions stored on a tangible memory resource such as a memory resource and executable by a processing resource. Other instructions may also be utilized as will be discussed further below in other examples. Additionally, the gateway server 140 may include a network connection interface 142 to connect to the computing system 100 through the network 150 and to the cloud services servers 144, 146, either directly or through the network 150.

The cloud services activation receipt instructions receives a bundled cloud services activation request for the printing device 130 through the link 158 of the network 150. The bundled cloud services activation request includes a plurality of individual cloud services activation requests which are targeting a variety of web services. That is, a plurality of bundled cloud services activation requests are bundled together as a single transmission that is received by the gateway server 140. The plurality of bundled cloud services activation requests are unpackaged or unbundled by the unbundling instructions of the gateway server and are relayed by the relay instructions of the gateway server to a plurality of targeted cloud services servers (e.g., cloud services servers 144, 146). For example, if an individual cloud services activation request within the bundled cloud services activation requests relates to activating a remote printing cloud service, the individual cloud services activation request may be targeted to a remote printing cloud services server. In this way, the gateway server 140 relays and distributes the individual cloud services activation requests to the appropriated (or targeted) cloud services servers.

In examples, the cloud services activation request includes information about the printing device, an authentication token, and a plurality of individual cloud services activation requests. Information about the printing device may include a printing device identifier, a printing device model or serial number, an internet protocol address of the printer, etc. A variety of other information about the printing device may also be included in the cloud services activation request depending upon the types of cloud services to be activated, the type of printing device, etc. For example, if an ink subscription cloud service is to be activated, the information about the printing device may include models of ink cartridges.

The cloud services servers 144, 146 are individual servers, virtual servers, distributed server, or other suitable servers that activate and/or host cloud processes for the printing device 130. For example, cloud services server 144 may host services relating to remote printing such that the printing device 130 may receive content to be printed from a remote user via the cloud services server 144. Similarly, cloud services server 146 may represent a product registration host to register the printing device 130. Of course, other cloud services are possible. Although the cloud services servers 144, 146 are shown as being directly connected to the gateway server 140, the cloud services servers 144, 146 may be connected through a network such as network 150 or through another network.

The network 150 represents generally hardware components and computers interconnected by communications channels that allow sharing of resources and information. The network 150 may include one or more of a cable, wireless, fiber optic, or remote connection via a telecommunication link, an infrared link, a radio frequency link, or any other connectors or systems that provide electronic communication. The network 150 may include, at least in part, an intranet, the internet, or a combination of both. The network 150 may also include intermediate proxies, routers, switches, load balancers, and the like. The paths followed by network 150 among the computing system 100, the printing device 130, the gateway server 140, and the cloud services servers 144, 146 as depicted in FIG. 1 represent the logical communication paths between these devices, not necessarily the physical paths between the devices.

FIG. 2 illustrates a block diagram of a computing system 200 to activate cloud services for a printing device via a gateway server according to examples of the present disclosure. The computing system 200 may include a network connection setup module 220, a printing device activation module 222, a cloud credentials module 226, and a cloud services activation module 226. In one example, the modules described herein may be a combination of hardware and programming instructions. The programming instructions may be processor executable instructions stored on a tangible memory resource such as a memory resource, and the hardware may include a processing resource for executing those instructions. Thus the memory resource can be said to store program instructions that when executed by the processing resource implement the modules described herein. Other modules may also be utilized as will be discussed further below in other examples. In different implementations, more, fewer, and/or other components, modules, instructions, and arrangements thereof may be used according to the teachings described herein. In addition, various components, modules, etc. described herein may be implemented as computer-executable instructions, hardware modules, special-purpose hardware (e.g., application specific hardware, application specific integrated circuits (ASICs), and the like, or some combination or combinations of these.

The network connection setup module 220 of computing system 200 causes the printing device to connect to the network. In examples, the computing system 200 may connect to the printing device via a direct wireless link such as via an 802.11 compliant connection, a Bluetooth connection, a near field communication connection, or another suitable connection. Once connected, the network connection setup module 220 of the computing system 200 may cause the printing device to connect to the network. For example, this may include causing the printing device to enter an automatic network configuration, which may cause the printing device to connect to a network, such as a wired or wireless network. The computing system 200 and the printing device may terminate the direct wireless link and instead begin communicating via the network, for example. Once connected to the network, the printing device may receive an IP address, subnet mask address: gateway address, dynamic name server address, proxy server address, port address, network name, network security credentials, and/or other related network information to connect to the network, such as from a network resource (e.g., server, router, etc.) within the network.

Once the printing device is connected to the network, the printing device activation module 222 initiates a printing device activation process. Concurrent to the printing device activation process, the cloud credentials module 224 initiates a cloud credentials process. That is, the printing device activation module 222 and the cloud credentials module 224 initiate their respective processes at approximately the same time. For example, the printing device activation module 222 initiates and performs the printing device activation process while the cloud credentials module 224 initiates and performs the cloud credentials process. By performing these processes concurrently, time is saved.

In examples, the printing device activation process performed by the printing device activation module 222 may include gathering information about the printing device from the printing device and enabling cloud services on the printing device through the network. Gathering the information may include sending an information request command from the printing device activation module 222 to the printing device through the network. In response, the printing device transmits the requested information back to the computing system 200 through the network. The information gathered about the printing device may include a printing device identifier, a model number, a serial number, a name, and other appropriate information about the printing device. Enabling the cloud services on the printing device may include enabling cloud/web services in a firmware or memory (not shown) of the printing device. In examples, the printing device may be factory set to have cloud/web services be disabled, such that the cloud/web services are disabled until enabled. However, in other examples, the cloud/web services may be factory set to be enabled.

In examples, the cloud credentials process may include transmitting a request to the gateway server through the network to request a cloud authentication token. In examples, the request includes a user authentication credential. The user authentication credential may include a unique username and password combination, a serial number, a claim code, or any other suitable authentication credential. The user may provide the user authentication credential via a user interface (not shown) of the computing system 200. In examples, the user interface may be a web browser and/or mobile application. Additionally, the cloud credentials process may include receiving the cloud authentication token through the network responsive to the transmitted request.

The cloud services activation module 226 initiates a cloud services activation process to activate a cloud service for the printing device. The cloud services activation process includes, in some examples, transmitting a cloud services activation request to the gateway server through the network. The cloud services activation request includes a plurality of bundled cloud services activation requests. That is, a plurality of bundled cloud services activation requests are bundled together as a single transmission to the gateway server. The plurality of bundled cloud services activation requests are to be unpackaged by the gateway server and to be relayed by the gateway server to a plurality of cloud services servers.

Figure 3:
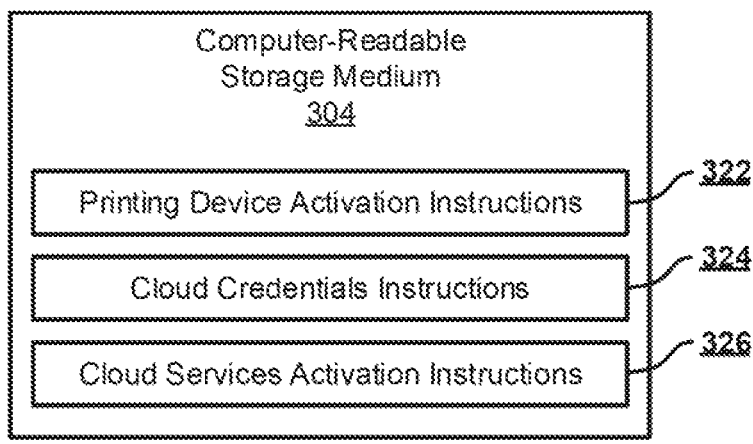
FIG. 3 illustrates a computer-readable storage medium storing instructions to activate cloud services for a printing device according to examples of the present disclosure.

FIG. 3 illustrates a computer-readable storage medium 304 storing instructions 322, 324, 326 to activate cloud services for a printing device according to examples of the present disclosure. The computer-readable storage medium 304 is non-transitory in the sense that it does not encompass a transitory signal but instead is made up of one or more memory components configured to store the instructions. The computer-readable storage medium may be representative of the memory resource 104 of FIG. 1 and may store machine executable instructions, which are executable on a computing system such as computing system 100 of FIG. 1.

In the example shown in FIG. 3, the instructions 322, 324, 326 may include print device activation instructions 322, cloud credentials instructions 324, and cloud services activation instructions 326. In other examples, additional instructions may be included in the computer-readable storage medium 304, such as network setup instructions. The instructions 322, 324, 326 of the computer-readable storage medium 304 may be executable by a processing resource so as to perform the techniques described herein, including the functionality described regarding the method 400 of FIG. 4. While the functionality of these instructions is described below with reference to the functional blocks of FIG. 4, such description should not be construed as so limiting.

Figure 4:
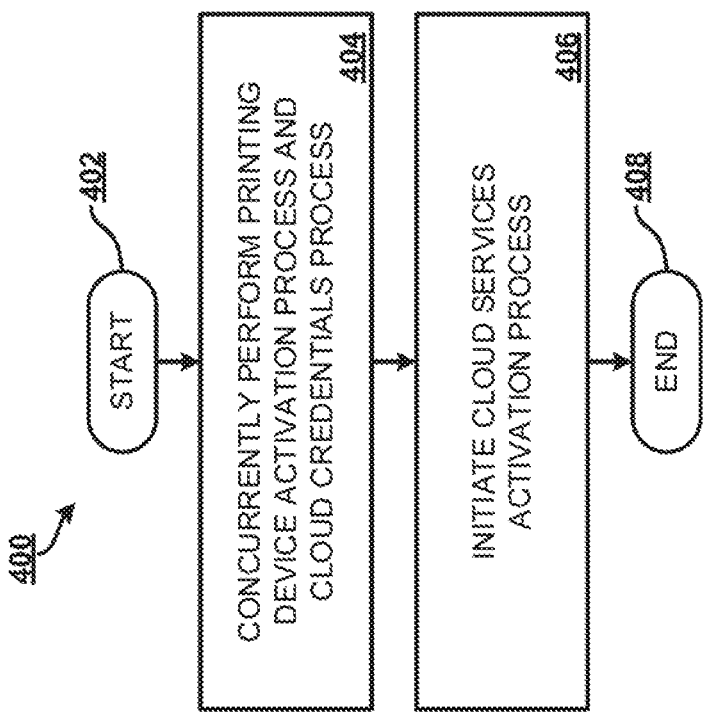
FIG. 4 illustrates a flow diagram of a method to activate cloud services for a printing device according to examples of the present disclosure.

In particular, FIG. 4 illustrates a flow diagram of a method 400 to activate cloud services for a printing device according to examples of the present disclosure. The method 400 may be stored as instructions on a non-transitory computer-readable storage medium such as computer-readable storage medium 304 of FIG. 3 or another suitable memory such as memory resource 104 of FIG. 1 that, when executed by a processor (e.g., processing resource 102 of FIG. 1), cause the processor to perform the method 400. It should be appreciated that the method 400 may be executed by a computing system or a computing device such as computing systems 100 and/or 200 of FIGS. 1 and 2 respectively or another suitable computing system or computing device.

At block 402, the method 400 begins and continues to block 404. At block 404, the method 400 includes concurrently performing, such as by printing device activation instructions 322 and cloud credentials instructions 324 of FIG. 3, a printing device activation process to activate a printing device (e.g., printing device 130 of FIG. 1) and a cloud credentials process to receive a cloud authentication token. In some examples, concurrently performing the printing device activation process and the cloud credentials process is performed by printing device activation module 122 and cloud credentials module 124 of FIG. 1 respectively.

In examples, the printing device activation process may include gathering information about the printing device from the printing device and enabling cloud services on the printing device. The information gathered about the printing device may include a printing device identifier, a model number, a serial number, a name, and other appropriate information about the printing device. Enabling the cloud services on the printing device may include enabling cloud/web services in firmware of the printing device. In examples, the printing device may be factory set to have cloud/web services be disabled, such that the cloud/web services are disabled until enabled. However, in other examples, the cloud/web services may be factory set to be enabled.

In examples, the cloud credentials process may include transmitting a request to a gateway server (e.g., gateway server 140 of FIG. 1) to request the cloud authentication token, wherein the request includes a user authentication credential. The user authentication credential may include a unique username and password combination, a serial number, a claim code, or any other suitable authentication credential. Additionally, the cloud credentials process may include receiving the cloud authentication token responsive to the transmitted request. The method 400 continues to block 406.

At block 406, the method 400 includes initiating, such as by cloud services activation instructions 326 of FIG. 3, a cloud services activation process to activate a cloud service for the printing device (e.g., printing device 130 of FIG. 1). In some examples, initiating the cloud services activation process is performed by the cloud services activation module 126 of FIG. 1.

In examples, initiating the cloud services activation process includes transmitting a cloud services activation request to a gateway server (e.g., gateway server 140 of FIG. 1). The cloud services activation request includes, for example, a plurality of bundled cloud services activation requests. That is, a plurality of bundled cloud services activation requests are bundled together as a single transmission to the gateway server. The plurality of bundled cloud services activation requests are to be unpackaged by the gateway server and to be relayed by the gateway server to a plurality of cloud services servers (e.g., cloud services servers 144, 146 of FIG. 1). In examples, multiple cloud services may be activated cloud services via the bundled cloud services activation request. For example, a first cloud services action request relating to remote printing functionality and a second cloud services activation request relating to ink subscription services may be bundled together to form a plurality of bundled cloud services activation requests. The bundled requests are unbundled by the gateway server and are appropriately relayed to the cloud services servers 144, 146. The method 400 continues to block 408, where method 400 terminates.

Figure 5:
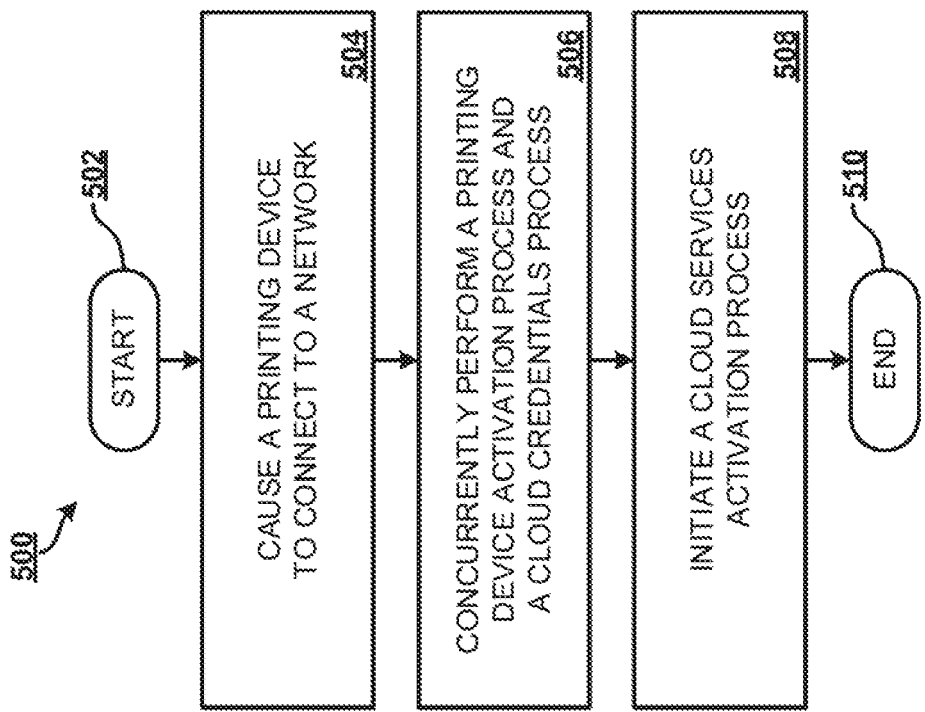
FIG. 5 illustrates a flow diagram of a method to activate cloud services for a printing device according to examples of the present disclosure.

Additional instructions and processes also may be included. For example, the computer-readable storage medium 304 may include instructions to cause the printing device (e.g., printing device 130 of FIG. 1) to connect to a network (e.g., network 150 of FIG. 1) as shown in FIG. 5. The network connection instructions may execute prior to concurrently performing the printing device activation process and the cloud credentials process. It should be understood that the processes depicted in FIG. 4 represent illustrations, and that other processes may be added or existing processes may be removed, modified, or rearranged without departing from the scope and spirit of the present disclosure.

FIG. 5 illustrates a flow diagram of a method 500 to activate cloud services for a printing device according to examples of the present disclosure. The method 500 may be stored as instructions on a non-transitory computer-readable storage medium such as computer-readable storage medium 304 of FIG. 3 or another suitable memory such as memory resource 104 of FIG. 1 that, when executed by a processor (e.g., processing resource 102 of FIG. 1), cause the processor to perform the method 500. It should be appreciated that the method 500 may be executed by a computing system or a computing device such as computing systems 100 and/or 200 of FIGS. 1 and 2 respectively or another suitable computing system or computing device.

At block 502, the method 500 begins and continues to block 504. At block 504, the method 500 includes causing a printing device (e.g., printing device 130 of FIG. 1) to connect to a network (e.g., network 150 of FIG. 1). For example, this may include causing the printing device to enter an automatic network configuration, which may cause the printing device to connect to a network, such as a wired or wireless network. The printing device may receive an IP address and other related network information to connect to the network. In some examples, causing the printing device to connect to a network is performed by the network connection setup module 120 of FIG. 1. In examples, causing the printing device to connect to the network occurs prior to concurrently performing the printing device activation process and the cloud credentials process at block 506.

At block 506, the method 500 includes concurrently performing a printing device activation process to activate a printing device (e.g., printing device 130 of FIG. 1) and a cloud credentials process to receive a cloud authentication token. In some examples, concurrently performing the printing device activation process and the cloud credentials process is performed by printing device activation module 122 and cloud credentials module 124 of FIG. 1 respectively.

In examples, the printing device activation process may include gathering information about the printing device from the printing device and enabling cloud services on the printing device. The information gathered about the printing device may include a printing device identifier, a model number, a serial number, a name, and other appropriate information about the printing device. Enabling the cloud services on the printing device may include enabling cloud/ web services in firmware of the printing device. In examples, the printing device may be factory set to have cloud/web services be disabled, such that the cloud/web services are disabled until enabled. However, in other examples, the cloud/web services may be factory set to be enabled.

In examples, the cloud credentials process may include transmitting a request to a gateway server (e.g., gateway server 140 of FIG. 1) to request the cloud authentication token, wherein the request includes a user authentication credential. The user authentication credential may include a unique username and password combination, a serial number, a claim code, on any other suitable authentication credential. Additionally, the cloud credentials process may include receiving the cloud authentication token responsive to the transmitted request. The method 500 continues to block 508.

At block 508, the method 500 includes initiating a cloud services activation process to activate a cloud service for the printing device (e.g., printing, device 130 of FIG. 1). In some examples, initiating the cloud services activation process is performed by the cloud services activation module 126 of FIG. 1.

In examples, initiating the cloud services activation process includes transmitting a cloud services activation request to a gateway server (e.g., gateway server 140 of FIG. 1. The cloud services activation request includes, for example, a plurality of bundled cloud services activation requests. That is, a plurality of bundled cloud services activation requests are bundled together as a single transmission to the gateway server. The plurality of bundled cloud services activation requests are to be unpackaged by the gateway server and to be relayed by the gateway server to a plurality of cloud services servers (e.g., cloud services servers 144, 146 of FIG. 1). In examples, multiple cloud services may be activated via the bundled cloud services activation request. For example, a first cloud services action request relating to remote printing functionality and a second cloud services activation request relating to ink subscription services may be bundled together to form a plurality of bundled cloud services activation requests. The bundled requests are unbundled by the gateway server and are appropriately relayed to the cloud services servers 144, 146. The method 500 continues to block 510, where method 500 terminates.

Additional processes also may be included. For example, the method 500 may include receiving an acknowledgement of successful cloud services activation from the gateway server. It should be understood that the processes depicted in FIG. 5 represent illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or blocks are intended to be supported by the present disclosure.

What is claimed is:

1. A non-transitory computer-readable storage medium storing instructions that, when executed by a processor, cause the processor to:
   concurrently perform a printing device activation process to activate a printing device and a cloud credentials process to receive a cloud authentication token; and
   initiate a cloud services activation process to activate a plurality of cloud services for the printing device.

2. The non-transitory computer-readable storage medium of claim 1, wherein the printing device activation process comprises:
   gathering information about the printing device from the printing device, and
   enabling cloud services on the printing device.

3. The non-transitory computer-readable storage medium of claim 2, wherein the information about the printing device includes a printing device identifier.

4. The non-transitory computer-readable storage medium of claim 1, wherein the cloud credentials process comprises:
   transmitting a request to a gateway server to request the cloud authentication token, wherein the request includes a user authentication credential, and
   receiving the cloud authentication token responsive to the transmitted request.

5. The non-transitory computer-readable storage medium of claim 1, wherein initiating the cloud services activation process further comprises transmitting a cloud services activation request to a gateway server.

6. The non-transitory computer-readable storage medium of claim 5, wherein the cloud services activation request includes a plurality of bundled cloud services activation requests to be unpackaged by the gateway server and to be relayed by the gateway server to a plurality of cloud services servers.

7. The non-transitory computer-readable storage medium of claim 1, further storing instructions that, when executed by the processor, cause the processor to:
   cause the printing device to connect to a network prior to concurrently performing the printing device activation process and the cloud credentials process.

8. A method comprising:
   causing, by a computing system, a printing device to connect to a network;
   concurrently performing, by the computing system, a printing device activation process to activate the printing device and a cloud credentials process to receive a cloud authentication token from a gateway server; and
   initiating, by the computing system, a cloud services activation process to activate a plurality of cloud services for the printing device by transmitting a cloud services activation request to the gateway server.

9. The method of claim 8, further comprising:
   receiving, by the computing system, an acknowledgement of successful cloud services activation from the gateway server.

10. The method of claim 8, wherein the cloud services activation request includes a plurality of bundled cloud services activation requests to be unpackaged by the gateway server and to be relayed by the gateway server to a plurality of cloud services servers.

11. The method of claim 8,
    wherein the printing device activation process comprises gathering information about the printing device from the printing device, and enabling cloud services on the printing device; and
    wherein the cloud credentials process comprises transmitting a request to the gateway server to request the cloud authentication token, wherein the request includes a user authentication credential, and receiving the cloud authentication token responsive to the transmitted request.

12. The method of claim 8, wherein causing the printing device to connect to the network occurs prior to concurrently performing the printing device activation process and the cloud credentials process.

13. A computing system comprising:
    a processor; and
    a non-transitory machine-readable storage medium that comprises instructions that enable the processor to:
    cause a printing device to connect to a network;
    perform a printing device activation process, the printing device activation process comprising gathering information about the printing device from the printing device and enabling cloud services on the printing device;
    perform a cloud credentials process, the cloud credentials process comprising transmitting a request to a gateway server to request a cloud authentication token and receiving the cloud authentication token responsive to the transmitted request; and
    activate a plurality of cloud services for the printing device by transmitting a cloud services activation request to the gateway server,
    wherein the printing device activation process and the cloud credentials process are performed concurrently.

14. The computing system of claim 13, wherein causing the printing device to connect to the network occurs prior to concurrently performing the printing device activation process and the cloud credentials process.

* * * * *